(12) United States Patent
Rao

(10) Patent No.: US 10,045,174 B1
(45) Date of Patent: Aug. 7, 2018

(54) MANAGED DEVICE MIGRATION AND CONFIGURATION

(71) Applicant: VMware, Inc., Palo Alto, CA (US)

(72) Inventor: Shubha Rao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/452,979

(22) Filed: Mar. 8, 2017

(51) Int. Cl.
  *H04M 3/00* (2006.01)
  *H04W 4/50* (2018.01)
  *H04W 4/00* (2018.01)
  *H04W 4/60* (2018.01)

(52) U.S. Cl.
  CPC .............. *H04W 4/50* (2018.02); *H04W 4/001* (2013.01); *H04W 4/003* (2013.01); *H04W 4/60* (2018.02)

(58) Field of Classification Search
  CPC ............................... H04W 4/001; H04W 4/003
  USPC ......................................................... 455/419
  See application file for complete search history.

(56) References Cited

U.S. PATENT DOCUMENTS

| 6,735,691 B1 * | 5/2004 | Capps ................. G06F 9/44505 713/1 |
| 9,037,685 B2 * | 5/2015 | Welingkar ........ G06F 17/30575 709/219 |

* cited by examiner

*Primary Examiner* — Amancio Gonzalez
(74) *Attorney, Agent, or Firm* — Thomas | Horstemeyer, LLP

(57) ABSTRACT

Various examples for providing managed device migration and configuration are described. In one example, a computing environment can detect a desired migration from a first device to a second device, where the second device is intended to replace the first device. The computing environment can save a device profile of the first client device that describes its current configuration in memory and can cause an installation of client applications on the second client device previously installed on the first client device. Additionally, the computing environment can configure the client applications on the second client device based on settings retrieved from the device profile.

20 Claims, 7 Drawing Sheets

US 10,045,174 B1

MANAGED DEVICE MIGRATION AND CONFIGURATION

BACKGROUND

With the emergence of bring-your-own-device (BYOD) technology in the workplace, enterprises permit employees or other personnel to use their own devices for business purposes. Devices can be used to access enterprise data, such as email and corporate documents. However, prior to an employee using his or her own device in the workplace, a company can require the employee to enroll with a management service capable of protecting enterprise data from theft, loss, and unauthorized access. Administrators of the management service can utilize the management service to oversee operation of the devices enrolled with or otherwise managed by the service.

A device can interact with a management service through an agent application. For instance, the agent application can oversee the safe installation and execution of other types of applications, such as word processing applications, spreadsheet applications, or other applications. Various types of applications require a license to be purchased by a person or an enterprise before the applications can be used. Additionally, an end user of a device can customize his or her device to have varying operating system configurations, appearance settings, or software applications installed on the device. When the user upgrades to a new device, such as a new smartphone, the user is required to re-customize his or her device. Additional complications arise for the management service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
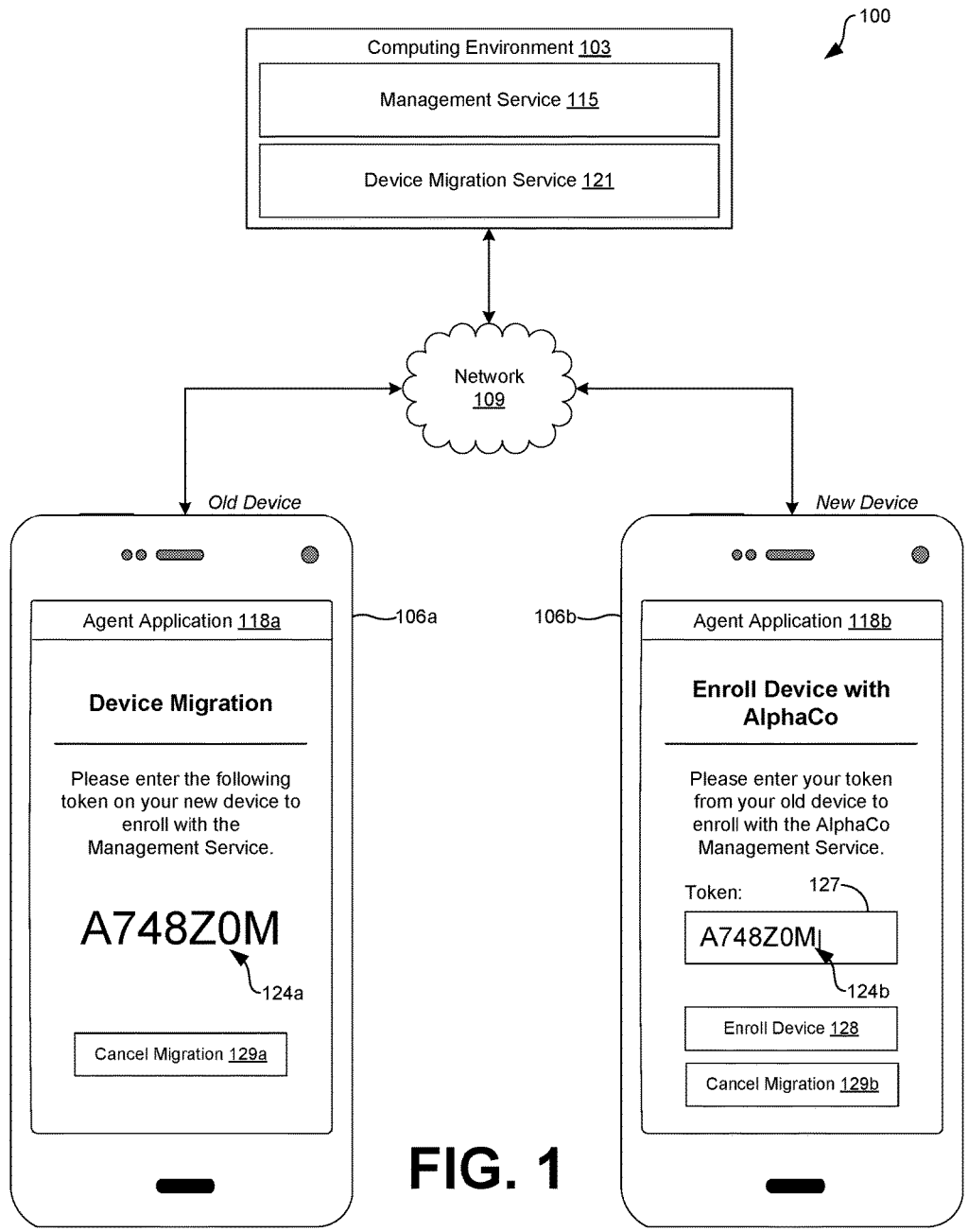
FIG. 1 is a drawing of a networked environment that includes a computing environment having a management service for migrating devices.

The present disclosure relates to managed device migration and configuration. An individual can have a smartphone, tablet, laptop, or other computing device used for enterprise-related purposes. An IT administrator can require the individual to enroll his or her device with a management service that can oversee operation of the user's device with respect to the protection of enterprise data. The individual might have customized his or her device to his or her liking, for example, by installing various applications, adjusting brightness or volume settings, enabling or disabling push notifications, as well as performing other configurations. However, over time, the user's device may not perform up to current computing standards or otherwise can become unusable through wear and tear. Likely, the user will want to upgrade or otherwise replace his or her device.

Traditionally, to begin using a new device in a BYOD environment, a user would have to perform an extensive device migration process, for example, requiring the user to unenroll his or her old device with the management service and enroll the new device with the management service. Any customizations or configurations performed on the user's old device are lost in the migration.

Additionally, some management services can manage software licenses or other arrangements for the use of particular applications or other resources. If a user enrolls the new device with the management service prior to unenrolling the old device, an additional license would have to be acquired creating unnecessary expense. Accordingly, it is beneficial to provide a mechanism for the user to migrate to a new device without having to manually unenroll and enroll the devices and manually reconfigure the new device. Thus, various examples for providing managed device migration and configuration are described.

In one example, a computing environment can detect a desired migration from a first device to a second device, where the second device is intended to replace the first device. The computing environment can save a device profile of the first device that describes a current configuration of the first device, and can cause a display of a token on the first device that can include a randomly generated string of alphanumeric characters. If the token shown on the first device is entered or otherwise provided on the second device, the computing environment can cause a configuration of the second device based at least in part on the device profile of the first device. In some examples, the configuration of the second device can include automatically enrolling the second device with the management service.

In another example, a computing environment can detect a desired migration from a first device to a second device, where the second device is intended to replace the first device. The computing environment can save a device profile of the first client device that describes its current configuration in memory and can cause an installation of client applications on the second client device previously installed on the first client device. Additionally, the computing environment can configure the client applications on the second client device based on applications settings or other settings retrieved from the device profile.

With reference to FIG. 1, shown is an example of a networked environment 100. The networked environment 100 can include a computing environment 103, a first client device 106a, and a second client device 106b (collectively "client devices 106") in communication with one another over a network 109. As an employee or other individual in a BYOD environment can periodically replace his or her old device (hereinafter "first client device 106a") with a new device (hereinafter "second client device 106b"), the networked environment 100 can be configured to perform managed device migrations. For instance, if an employee wishes to replace an old smartphone with a newly purchased smartphone, or replace an old personal computer with a laptop, the networked environment 100 can assist with the transition to the new device. However, a client device 106 being replaced could be enrolled with a management service 115 that oversees operation of the client device 106 to protect enterprise data from unauthorized access or other form of data loss. For instance, an employer can require its employees to enroll their device with the management service 115 that, through interactions with an agent application 118a . . . 118b installed on the client devices 106, oversees operation of the devices.

To perform a migration from a first client device 106a to a second client device 106b, the computing environment 103 can include a device migration service 121. In one example, the device migration service 121 generates a token 124 when a user desires to migrate devices or, in other words, wishes to start a device migration process where the old device is replaced with a new device. The device migration service 121 can enroll the second client device 106b with the management service 115 in place of the first client device 106a while also configuring the second client device 106b to match a current configuration of the first client device 106a. The token 124 can be shown on the first client device 106a and, thereafter, the user can enter the token 124 into a form 127 on the second client device 106b and select an enroll device component 128 that starts a device migration process on the new device. To this end, when a token 124b is provided on the second client device 106b that matches the token 124a shown on the first client device 106a, various actions can be performed to configure and enroll the second client device 106b with the management service 115, as will be described.

Additionally, in some examples, a cancel migration component 129 can be shown in either one of the client devices 106 while a device migration process is active. If a user manipulates the cancel migration component 129, the device migration process can be canceled, and the computing environment 103 can restore any functionality disabled on the first client device 106a during the device migration process.

Figure 2:
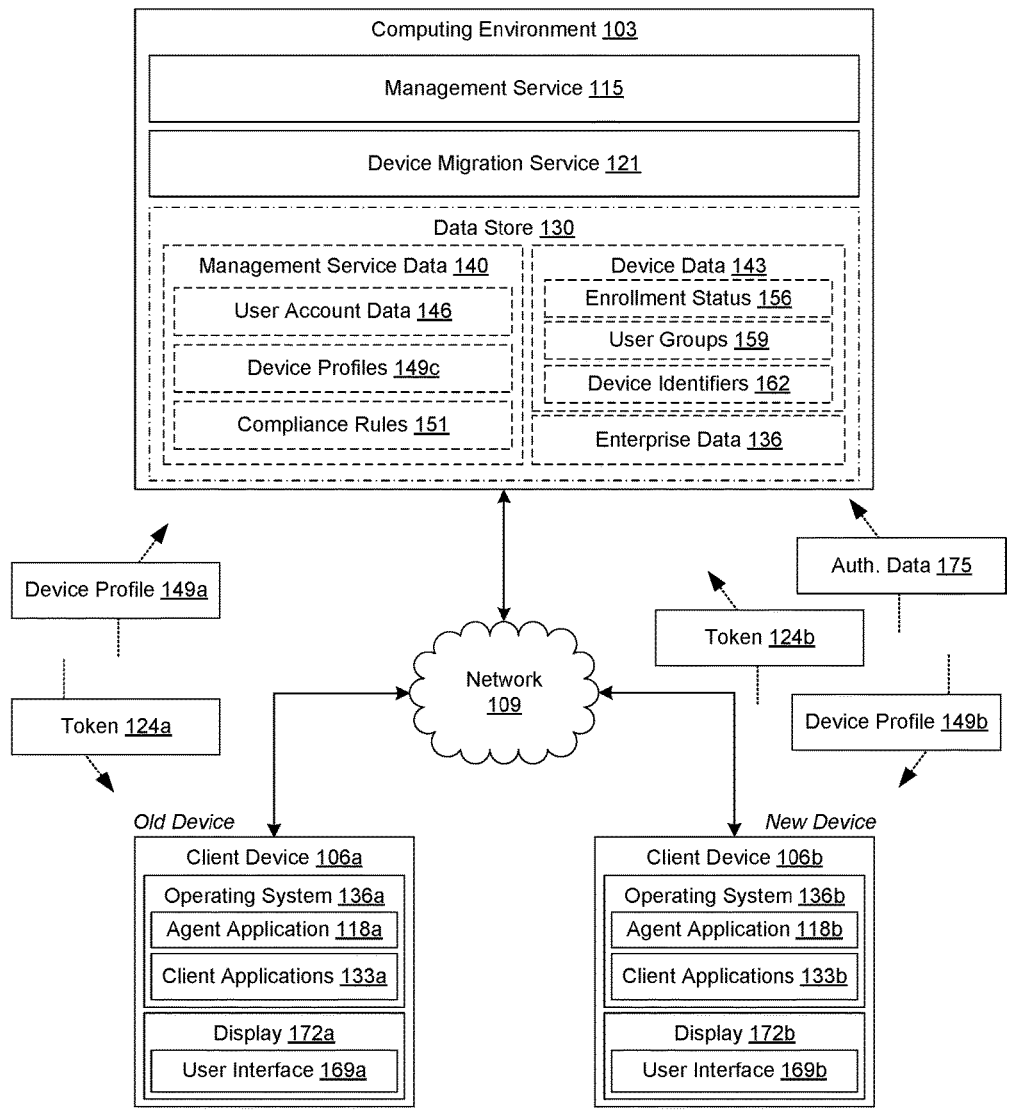
FIG. 2 is another drawing of the networked environment that includes the computing environment having a management service for migrating devices.

With reference to FIG. 2, shown is another example of the networked environment 100. Similar to FIG. 1, the networked environment 100 can include the computing environment 103, the first client device 106a, and the second client device 106b. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement.

The computing devices can be located in a single installation or can be distributed among many different geographical locations. The computing environments 103 can also include or be operated as one or more virtualized computer instances. For purposes of convenience, the computing environment 103 is referred to herein in the singular, although it is understood that a plurality of computing environments 103 can be used. As the computing environment 103 communicates with the client devices 106 remotely over the network 109, the computing environment 103 can be described as a "remote" or a "cloud" computing environment 103.

The computing environment 103 can include a data store 130. The data store 130 can include memory of the computing environment 103, mass storage resources of the computing environment 103, or any other storage resources on which data can be stored by the computing environment 103. The data store 130 can include one or more databases, such as a structured query language (SQL) database, a non-SQL database, or other appropriate database. The data stored in the data store 130, for example, can be associated with the operation of the various applications or functional entities described below.

The components executed on the computing environment 103 can include, for example, the management service 115, the device migration service 121, as well as other applications, services, processes, systems, engines, or functionality not discussed in detail herein. The management service 115 can be executed to oversee the operation of client devices 106 enrolled (or to be enrolled) with the management service 115. In some embodiments, an entity, such as one or more enterprises, companies, or other organizations, can operate the management service 115 to oversee or manage the operation of the client devices 106 of its employees, contractors, customers, or other individuals having an account with the management service 115.

The management service 115 can cause various software components to be installed on a client device 106. Such software components can include, for example, client applications 133a . . . 133b, resources, libraries, drivers, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data 136 is secured on the client device 106.

The management service 115 can interact with one or more client applications 133 executed on the client device 106 to perform management functions. In one example, the management service 115 can interact with the agent application 118 to enroll a client device 106 with the management service 115. When enrolled, the agent application 118 can be registered as a device administrator of the client device 106, which can provide the agent application 118 with sufficient privileges to control the operation of the client device 106. In one example, the agent application 118 can be registered as the device administrator through the installation of a management profile at an operating system 136a . . . 136b that causes the operating system 136 to designate the agent application 118 as the device administrator.

The management service 115 can direct the agent application 118 to perform various device management functions on the client device 106. For example, the management service 115 can direct the agent application 118 to control access to certain software or hardware functions available on the client device 106. As a result, the management service 115 can verify that the configuration and operation of the client device 106 is in conformance with predefined criteria that ensures that enterprise data 136, or other data, is protected from data loss, unauthorized access, or other harmful events.

The management service 115 can further provision enterprise data 136 to the client device 106 through the agent application 118. In one example, the management service 115 can cause the agent application 118 to control use of the client device 106, or provision enterprise data 136 to the client device 106, through use of a command queue provided by the management service 115. In some examples, the management service 115 can store commands in a command queue associated with a particular client device 106 and can configure an agent application 118 executed by such client device 106 to retrieve the contents of the command queue. In one example, the agent application 118 can be configured to retrieve the contents of the command queue on a configured interval, such as every four hours, or upon detection of a certain event, such as an unauthorized application being executed by the client device 106. The management service 115 can also push commands to the agent application 118 over the network 109.

In any case, the agent application 118 can receive the contents of the command queue from the management service 115. In one example, the contents of the command queue can include a command that the agent application 118 should cause to be executed on the client device 106. In another example, the contents of the command queue can include a resource or a client application 133 that the agent application 118 should cause to be installed on the client device 106, which the client device 106 can access through a specified uniform resource locator (URL).

The data stored in the data store 130 can include, for example, the enterprise data 136, management service data 140, device data 143, as well as other data. The management service data 140 can include, for example, user account data 146, device profiles 149a . . . 149c, compliance rules 151, as well as other data. The user account data 146 can include information pertaining to end users of the client devices 106 enrolled with the management service 115. For instance, the user account data 146 can include data used to authenticate an end user, such as a username, password, email address, biometric data, device identifier, registry identifier, or other data. Additionally, the user account data 146 can include other information associated with an end user, such as name, organization unit, or other information. Each user account can be associated with a particular entity, such as an enterprise, employer, or other entity.

The device profiles 149 can include data describing a current configuration of a client device 106. In some examples, a device profile 149 can include an extensible markup language (XML) document that contains information pertaining to the configuration of the first client device 106a in a structured hierarchy. For example, the device profile 149 can include a listing of each client application 133 installed on the first client device 106a, as well as other settings. These settings can include, for example, settings associated with each client application 133; settings of the operating system 136, the aesthetic configuration, keyboard or other input device settings, as well as other settings. Configuration of the second client device 106b can be performed by the agent application 118 using the device profile 149 generated for the first client device 106a, as will be discussed.

The compliance rules 154 can include constraints specified by an administrator for compliance of a client device 106 with the management service 115. In one example, the agent application 118 can configure hardware or software functionality of a client device 106 such that the client device 106 is in conformance with the compliance rules 154. For instance, an administrator can specify whether Bluetooth®, camera, microphone, or related functions are permitted on the client device 106. Additionally, the agent application 118 can identify when the client device 106 is not in conformance with the compliance rules 154, as well as other policies, and can take appropriate remedial actions, such as denying access to enterprise data 136, restricting access to particular networks, or enabling or disabling other functionality of the client device 106 of the agent application 118.

In some examples, the management service 115 communicates with the agent application 118 or other client application 133 executable on the client device 106 to determine whether vulnerabilities exist on the client device 106 that do not satisfy compliance rules 154. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 133, or other vulnerability as can be appreciated.

Device data 143 can include, for example, data pertaining to an enrollment status 156 for the client devices 106. In one example, a client device 106 for an end user designated as "enrolled" can be permitted to access the enterprise data 136 while a client device 106 designated as "not enrolled," or having no designation, can be denied access to the enterprise data 136. Device data 143 can also include data pertaining to user groups 159. An administrator can specify one or more of the client devices 106 as belonging to a particular user group 159 and, instead of configuring each client device 106 individually, configure a collection of client devices 106 through a user group 159. In further examples, an enrollment status 156 can include a "change device" state, meaning a device migration process has been initiated on the client device 106 where the client device 106 is waiting for an entry of a token 124.

In some examples, device data 143 can include device identifiers 162. Device identifiers 162 can include a string of alphanumeric characters, or other characters and symbols, capable of uniquely identifying a client device 106. In some examples, the device identifiers 162 include unique device identifiers (UDIDs). The device identifiers 162 can be associated with an enrollment status 156 in the data store 130 to identify which devices are enrolled with the management service 115.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 136 configured to execute various client applications 133, such as the agent application 118 or other client application 133. Some client applications 133 can access network content served up by the computing environment 103 or other servers, thereby rendering a user interface 169a . . . 169b on a display 172a . . . 172b, such as a liquid crystal display (LCD), touch-screen display, or other type of display device. To this end, some client applications 133 can include a web browser or a dedicated application, and a user interface 169 can include a network page, an application screen, or other interface. Further, other client applications 133 can include device management applications, enterprise applications, social networking applications, word processors, spreadsheet applications, media viewing applications, or other applications.

In some examples, at least a portion of the client applications 133 are "managed applications" where the agent application 118 oversees or controls operation of the client applications 133. For instance, using an administrator console, an administrator of the management service 115 can distribute, secure, and track client applications 133 installed on client devices 106 enrolled with the management service 115. In some examples, the agent application 118 can configure and verify that managed applications operate in conformance with the compliance rules 151.

Next, a general description of the operation of the components of the networked environment 100 is provided. A user of the first client device 106a can use his or her device in a BYOD environment, where the first client device 106a is enrolled with the management service 115. The user can have configured the first client device 106a to his or her liking, for example, by installing various client applications 133, adjusting brightness or volume settings, enabling or disabling push notifications, as well as performing other configurations. However, over time, the first client device 106a may not perform up to current computing standards or otherwise can become unusable through wear and tear.

Traditionally, the process to start using a new device is long. For instance, a user might be required to unenroll the first client device 106a with the management service 115, which causes any enterprise data 136 stored on the first client device 106a to be removed. Next, the user must enroll the second client device 106b with the management service 115. Any customizations or configurations performed on the first client device 106a are lost in the migration. Additionally, the management service 115 can manage software licenses or other arrangements for the use of client applications 133. If a user enrolls the second client device 106b with the management service 115 prior to unenrolling the first client device 106a, an additional license would have to be acquired. Accordingly, it is beneficial to provide a mechanism for the user to migrate to a new device without having to manually unenroll and enroll the devices and reconfigure the new device.

A user can start a device migration process on the first client device 106a, for example, by selecting a "Start Device Migration" button or other user interface component, as can be appreciated. A token 124 can be shown in the display 172a of the first client device 106a where the user can copy the token 124 to a form 127 shown by the agent application 118b installed on the second client device 106b. However, prior to showing the token 124 in the display 172a, a device profile 149 can be generated that describes a current configuration of the first client device 106a.

In some examples, the device profile 149 includes an XML document that contains information pertaining to the configuration of the first client device 106a in a structured hierarchy or other convenient arrangement. For example, the device profile 149 can include a listing of each client application 133 installed on the client device 106; settings associated with each client application 133; operating system configurations; color, wallpaper, and lock screen settings; keyboard or other input device settings, as well as other settings as can be appreciated. An example structure of the device profile 149 is shown below:

```
<?xml version="1.0"?>
...
<applications>
    <application>BetaCo Word Processor</application>
    <application>BetaCo Spreadsheet</application>
    <application>BetaCo Photo Editors</application>
</applications>
<os_settings>
    <os>Mobile OS v10</os>
    <battery>Battery Saving Mode Enabled</battery>
    <push_notifications>Allowed</push_notifications>
</os_settings>
<settings>
    <keyboard>Standard US English Keyboard</keyboard>
    <wallpaper>photoffamily.jpg</wallpaper>
    <lockscreen>famousguitarist.jpg</lockscreen>
</settings>
...
```

When the token 124 is entered on the second client device 106b, the device profile 149 can be used by the agent application 118b to configure the second client device 106b.

In some examples, the computing environment 103 can require a two-factor authentication process where a user must provide authentication data 175 before being permitted to enter the token 124. For instance, before a form 127 for entry of the token 124 is shown, the user can be required to provide an enrollment URL, a username, a password, or other authentication data 175. However, in alternative examples, the token 124 can be the only required entry. If authentication is successful, and assuming the token 124 provided in the second client device 106b matches the token 124 shown on the first client device 106a, the first client device 106a and the second client device 106b can permit an automated unenrollment of the first client device 106a and an automated enrollment of the second client device 106b, respectively. Additionally, upon enrollment, the agent application 118b of the second client device 106b can perform an automated configuration of the second client device 106b matching the configuration of the first client device 106a. The agent application 118b can configure the second client device 106b "silently" as a background process or, in other words, as a process that does not require user input or a display of any user interfaces. For instance, the agent application 118b can generate command line arguments that cause the second client device 106b to download and install client applications 133, enterprise data 136, or other data.

Figure 3:
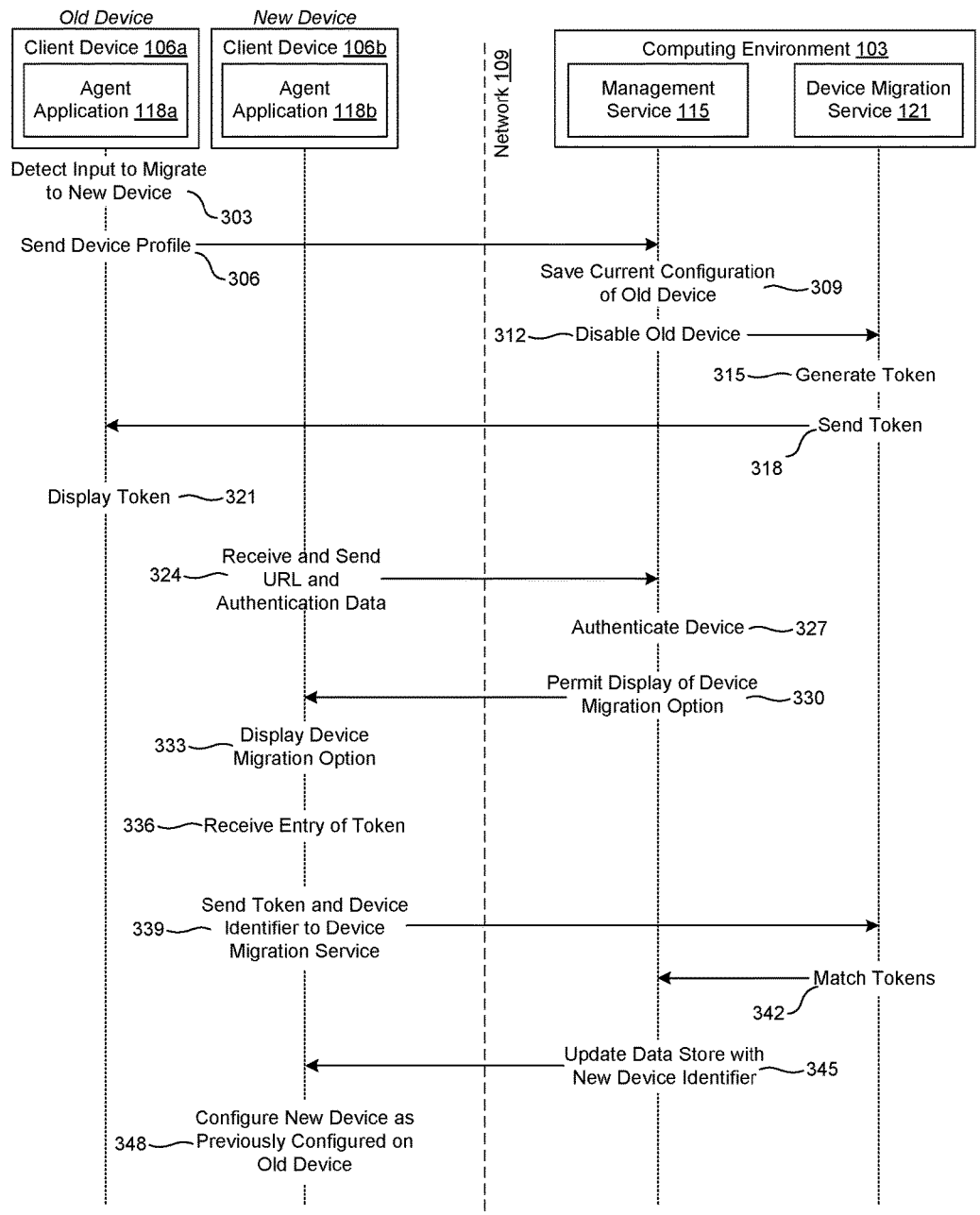
FIG. 3 is a sequence diagram illustrating functionality implemented by components of the networked environment.

Referring next to FIG. 3, a sequence diagram 300 is shown illustrating functionality implemented by components of the networked environment 100. Beginning with step 303, the first client device 106a can detect user input that indicates that the user desires to migrate to a new client device 106. For example, the user may wish to replace the first client device 106a with the second client device 106b. The first client device 106a can notify the computing environment 103 that the user desires to start a device migration, for example, by detecting a manipulation of a "Start Device Migration" button or other appropriate user interface component offered by the agent application 118a.

In step 306, the first client device 106a can generate and send a device profile 149 that describes a current configuration of the first client device 106a. In some examples, the device profile 149 includes an XML document that contains information pertaining to the configuration of the first client device 106a in a structured hierarchy. For example, the device profile 149 can include a listing of each client application 133 installed on the client device 106; settings associated with each client application 133; operating system configurations; color, wallpaper, and lock screen settings; keyboard or other input device settings, as well as other settings as can be appreciated. The device profile 149 can also be sent to the management service 115 periodically so that a user could migrate to a new client device 106b even if the old client device 106a is lost or disabled.

Next, in step 309, the computing environment 103 can store the device profile 149 in the data store 130 for later access. For example, the agent application 118b on the second client device 106b can use the device profile 149 to configure the second client device 106b to match the current configuration of the first client device 106a.

In step 312, the computing environment 103 can disable the first client device 106a while the device migration process is being performed. In other words, the computing environment 103 can "lock" or disable at least one function of the first client device 106a. For example, the computing environment 103 can disable the first client device 106a such that a user cannot access any features of the first client device 106a, such as turning on a display 172, allowing access to other client applications 133, or toggling power to the first client device 106a.

In another example, the computing environment 103 can disable specific functions of the first client device 106a, such as accessing a camera, downloading network content, accessing particular client applications 133, or similar function. The functionality disabled can be specified by an administrator of the management service 115 through an administrator console. In some examples, the cancel migration component 129 can remain accessible while other functionality of the first client device 106a is disabled. If a user manipulates the cancel migration component 129, the device migration process can be canceled, and the computing environment 103 can restore functionality to the first client device 106a.

In step 315, the computing environment 103 can generate a token 124 that can be used to identify the second client device 106b during the device migration process. In some examples, the computing environment 103 can randomly generate the token 124 as a string of alphanumeric characters or other symbols capable of reproduction using an appropriate input device. In other examples, the token 124 can include an identifier that is unique to the first client device 106a, such as a registry identifier or a UDID identifier. While the computing environment 103a can generate the token 124, in other examples, the token 124 can be generated locally on the first client device 106a.

In step 318, the computing environment 103 can send the token 124 to the first client device 106a for display. For instance, the computing environment 103 can generate user interface data or other network content that includes the token 124.

In step 321, the first client device 106a can display the token 124. For example, the agent application 118a can use the user interface data or other network content generated by the computing environment 103 to render a user interface 169 in a display 172 of the first client device 106a that includes the token 124.

Next, in step 324, the second client device 106b can receive an entry of an enrollment URL and other authentication data 175 and send the enrollment URL and the authentication data 175 to the computing environment 103. The authentication data 175 can include, for example, a username, an email address, a password, a PIN number, a group identifier, biometric data or other appropriate data provided to the agent application 118b during, for example, a first execution of the agent application 118b.

In step 327, the management service 115 can authenticate the second client device 106b using, for example, the enrollment URL and other authentication data 175 received from the second client device 106b. For example, the computing environment 103 can use the authentication data 175 to recognize that a user account being authenticated on the second client device 106b is the same as the account enrolled with the management service 115 on the first client device 106a. Alternatively, the computing environment 103 can recognize that the authentication data 175 pertains to a particular entity, such as an enterprise, that is associated with the first client device 106a. For example, if the first client device 106a is enrolled with the management service 115 through an enterprise, AlphaCo, an entry of an enrollment URL or email address that pertains to AlphaCo can be recognized by the computing environment 103.

In step 330, if the authentication of the second client device 106b is successful, the computing environment 103 can permit display of a device migration option which can include, for example, a form 127 that permits entry of the token 124. In one example, the form 127, as shown in FIG. 1, may not become available until authentication of the second client device 106b has been successful.

In step 333, the second client device 106b can display the device migration option, such as the form 127 that permits entry of the token 124.

In step 336, the second client device 106b can receive an entry of a token 124. For instance, a user of the second client device 106b can use a suitable input device to copy the token 124 shown in the display 172 of the first client device 106a into the form 127 of the second client device 106b.

In step 339, the token 124 and a device identifier 162 for the second client device 106b can be sent to the device migration service 121. The device identifier 162 can include a string of alphanumeric characters that uniquely identifies the second client device 106b. In some examples, the device identifier 162 includes a UDID for the second client device 106b.

In step 342, the device migration service 121 can determine whether the token 124 provided on the second client device 106b matches the token 124 shown on the first client device 106a (or other token 124). In the event the token 124 is matched, the device migration service 121 can start an enrollment of the second client device 106b with the management service 115 as well as a configuration of the second client device 106b using the device profile 149 received from the first client device 106a.

Hence, in step 345, the management service 115 can update the data store 130, or a database in the data store 130, to replace a device identifier 162 of the first client device 106a with a device identifier 162 of the second client device 106b. In a traditional process, the computing environment 103 would require the first client device 106a to unenroll, thereby causing the computing environment 103 to delete or archive all data pertaining to the first client device 106a. The computing environment 103 would then have to create a new entry in the data store 130 when the second client device 106b is enrolled, in so doing creating excessive memory queries and further encumbering the data store 130. By replacing the device identifiers 162 in the data store 130, as opposed to deleting and adding new entries, any software licenses required for the client applications 133 installed on the first client device 106a (and to be installed on the second client device 106b) would not have to be canceled.

In step 348, the agent application 118b on the second client device 106b can locally configure the device using the device profile 149. In other examples, the agent application 118b can configure the second client device 106b as instructed by the computing environment 103. For instance, the second client device 106b can install the same client applications 133 as those having been installed on the first client device 106a at the time of device migration. In another example, the second client device 106b can configure the desktop, wallpaper, or lock screen to match that of the first client device 106a. In yet another example, the second client device 106b can configure the settings of an operating system to match the previously configured settings on the first client device 106a.

In the example where the old client device 106a is lost or disabled, the device profile 149 can be previously stored by the management service 115. The management service 115 therefore need not display the token 124 at step 321 when the migration process has been otherwise initiated. Thereafter, the process can proceed to completion.

Figure 4A:
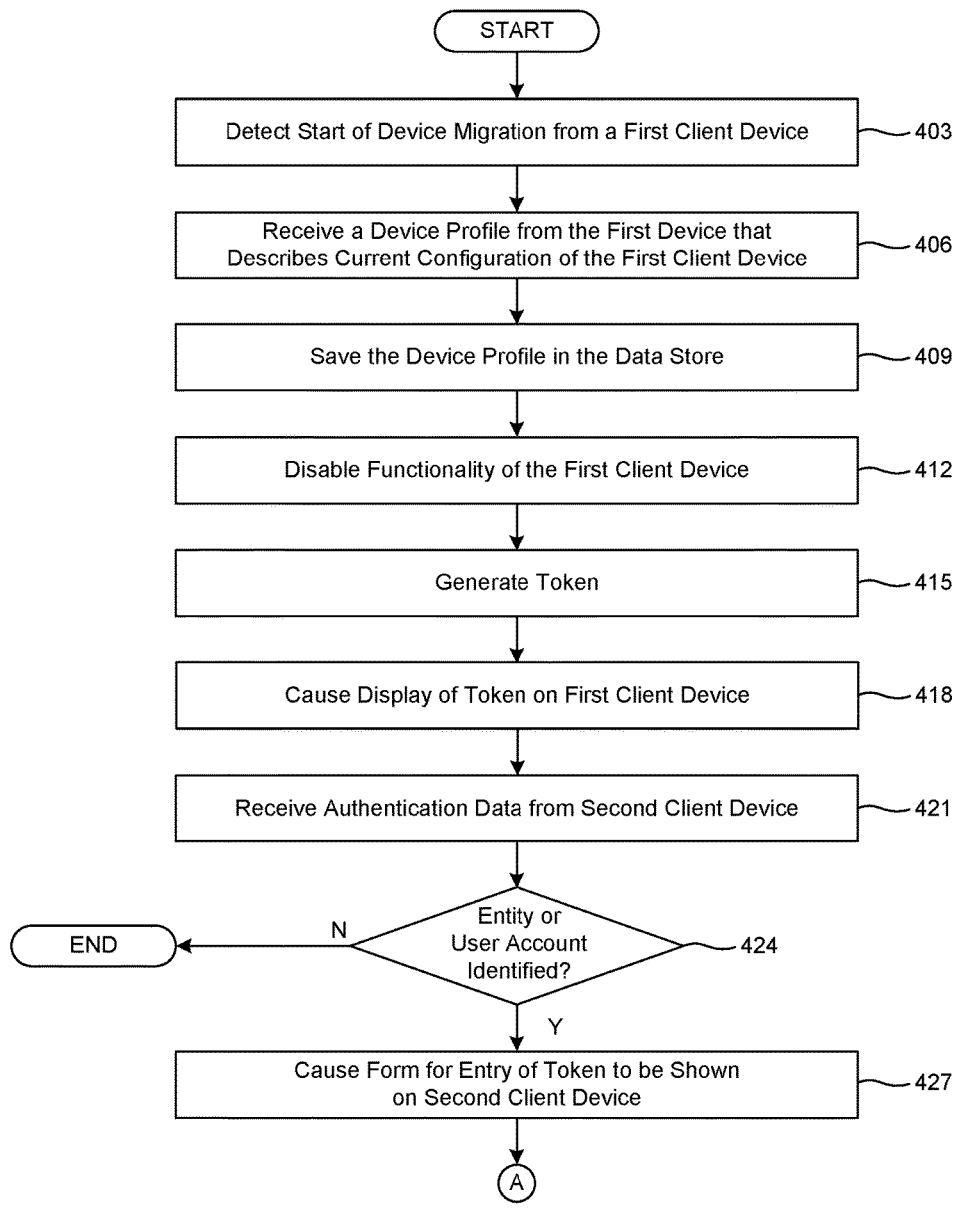
FIGS. 4A-4B are flowcharts illustrating functionality implemented by components of the networked environment.
Figure 4B:
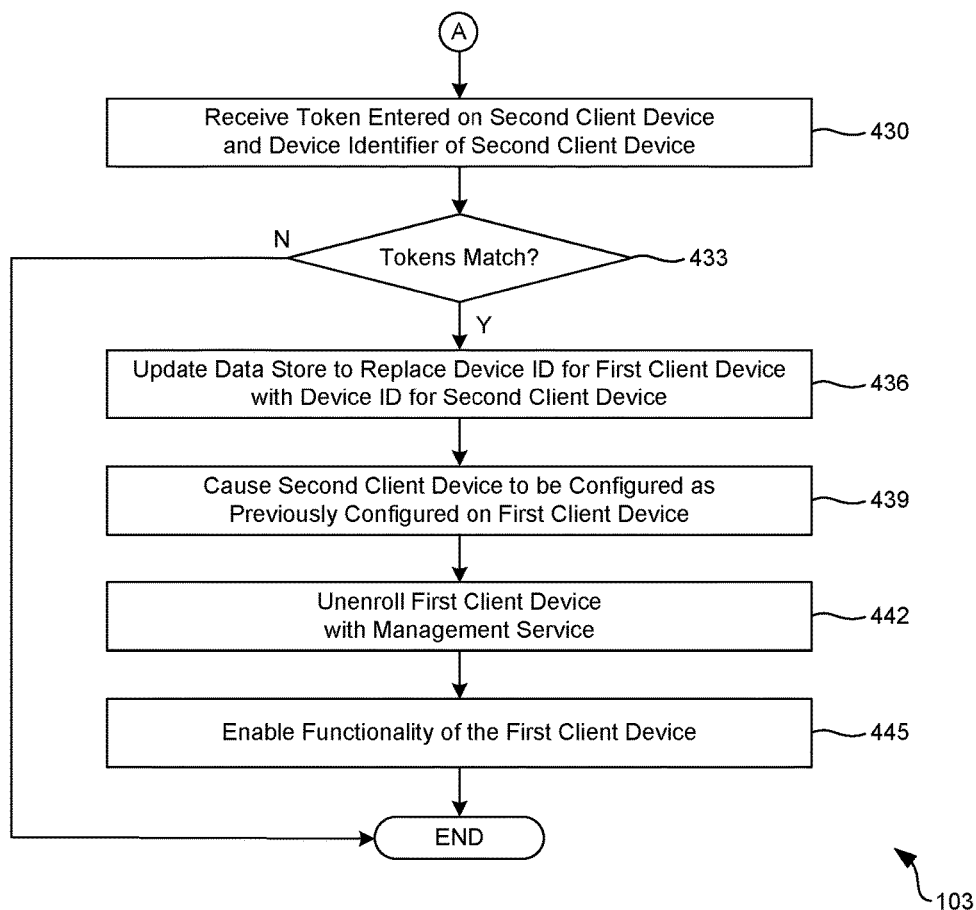

Moving on to FIGS. 4A and 4B, shown is a flowchart that provides one example of the operation of a portion of the computing environment 103. The flowcharts of FIGS. 4A and 4B can be viewed as depicting an example of elements of a method implemented by the management service 115, the device migration service 121, or other suitable software component according to one or more examples. The separation or segmentation of functionality as discussed herein is presented for illustrative purposes only.

Beginning with step 403, the computing environment 103 can detect a start of a desired device migration where a user desires to, for example, replace a first client device 106a enrolled with the management service 115 with a second client device 106b. For instance, the user may wish to replace an old smartphone with a newly purchased smartphone or similar device. In another example, the user may wish to replace an old tablet or personal computer with a newly purchased tablet or personal computer. The computing environment 103 can detect that the user desires to start a device migration, for example, by detecting a manipulation of a "Start Device Migration" button or other component of a user interface 169.

In step 406, the computing environment 103 can receive a device profile 149 from the first client device 106a that describes a current configuration of the first client device 106a. In some examples, the device profile 149 includes an XML document that contains information pertaining to the configuration of the first client device 106a in a structured hierarchy. In varying examples, step 406 can occur before or after step 403.

Next, in step 409, the computing environment 103 can store the device profile 149 received from the first client device 106a in the data store 130 for later access. For example, in the event that a second client device 106b is identified in the device migration process, the device profile 149 can be used to configure the second client device 106b to match the current configuration of the first client device 106a.

In step 412, the computing environment 103 can disable functionality of the first client device 106a while the device migration process is being performed. In other words, the computing environment 103 can "lock" or disable at least one function of the first client device 106a. For example, the computing environment 103 can disable the first client device 106a such that a user cannot access any features of the first client device 106a, such as turning on a display or powering off the first client device 106a. In another example, the computing environment 103 can disable specific functions of the first client device 106a, such as accessing a camera, downloading network content, accessing particular client applications 133, or similar function. In some examples, the cancel migration component 129 can remain accessible while other functionality of the first client device 106a is disabled.

In step 415, the computing environment 103 can generate a token 124 that can be used to identify the second client device 106b during the device migration process. In some examples, the computing environment 103 can randomly generate the token 124 as a string of alphanumeric characters, numerals, or other symbols capable of reproduction using an appropriate input device. In other examples, the token 124 can include an identifier that is unique to the first client device 106a. While the computing environment 103a can generate the token 124, in other examples, the token 124 can be generated locally on the first client device 106a.

In step 418, the computing environment 103 can cause a display of the token 124 on the first client device 106a. In one example, the computing environment 103 can generate network content, such as user interface data, that includes the token 124 for rendering in a display of the first client device 106a. The computing environment 103 can instruct the agent application 118, for example, to display the token 124 based on the network content generated.

In step 421, the computing environment 103 can receive authentication data 175 from the second client device 106b which, prior to receipt of the authentication data 175, would not be recognized. The authentication data 175 can include, for example, a username, a password, a PIN number, an email address, a group identifier, an enrollment URL, biometric data or other appropriate data that can be used to authenticate a user of the second client device 106b with the management service 115.

Thus, in step 424, the computing environment 103 can determine whether an entity or a user account is identified from the authentication data 175. For instance, if a user provides an email address having an extension of "@alpha-co.site" or an enrollment URL having domain of "alpha-co.site" the computing environment 103 can identify that the second client device 106b is associated with a user account for the AlphaCo entity.

Instead of requiring the user to provide additional enrollment information (which can be cumbersome), in step 427, the computing environment 103 can cause a form for entry of the token 124 to be shown on the second client device 106b. For example, knowing that a first client device 106a managed by AlphaCo has started a device migration process, and knowing that authentication data 175 associated with AlphaCo has been provided on the second client device 106b, a suitable user interface component can be shown that permits entry of the token 124. This process provides two-factor authentication as both authentication data 175 and a token 124 is required, although other single-factor or multi-factor authentication can be used.

In further examples, authentication can include the first client device 106a transmitting a beacon using Bluetooth®, NFC, RFID, or similar technology that can be received by the second client device 106b. To this end, authentication can include receipt of a signal from the beacon, an entry of the token 124, entry of authentication data 175, or other authentication method.

Moving on to step 430, shown in FIG. 4B, the computing environment 103 can receive the token 124 entered on the second client device 106b, as well as a device identifier 162 for the second client device 106b. As noted above, the device identifier 162 can include a string that uniquely identifies the second client device 106b, such as a UDID.

In step 433, the computing environment 103 can determine whether the token 124 generated in step 415, and shown in the display of the first client device 106a, matches the token 124 entered on the second client device 106b. If the tokens 124 do not match, the process can proceed to completion.

Alternatively, if the tokens 124 match, the process can proceed to step 436 where the computing environment 103 can update the data store 130 to replace a device identifier 162 of the first client device 106a with a device identifier 162 of the second client device 106b. In a traditional process, the computing environment 103 would require the first client device 106a to unenroll, thereby causing the computing environment 103 to delete or archive all data pertaining to the first client device 106a. The computing environment 103 would then have to create a new entry in the data store 130 when the second client device 106b is enrolled, in so doing creating unnecessary INSERT and DELETE SQL queries, or equivalent operations. By replacing the device identifiers 162 in the data store 130, as opposed to deleting and adding new entries, any software licenses required for the client applications 133 installed on the first client device 106a (and to be installed on the second client device 106b) would not have to be canceled.

Next, in step 439, the computing environment 103 can cause a configuration of the second client device 106b based at least in part on the device profile 149 of the first client device 106a using, for example, the device profile 149 stored in step 409. For example, the computing environment 103 can instruct an agent application 118 installed on the second client device 106b to install particular client applications 133, configure various settings, update various drivers, or perform other actions as needed to conform the configuration of the second client device 106b to previous configuration of the first client device 106a. The agent application 118 can oversee the download and installation of the client applications 133, or other resources, as needed.

In some examples, the computing environment 103 can send the device profile 149 to the second client device 106b, where the agent application 118 is configured to consult the device profile 149 while performing the automated configuration of the second client device 106b. In further examples, configuration of the second client device 106b can include enrolling the second client device 106b with the management service 115.

In step 442, the computing environment 103 can unenroll the first client device 106a with the management service 115. In some examples, unenrollment of the first client device 106a is performed by virtue of the device identifier 162 of the first client device 106a being replaced with a device identifier 162 of the second client device 106b, although, in some examples, additional steps can be needed. For example, the computing environment 103 can instruct the agent application 118 installed on the first client device 106a to remove any enterprise data 136 on the first client device 106a.

Finally, in step 445, the computing environment 103 can enable functionality on the first client device 106a, such as the functionality disabled in step 412. In the example where the old client device 106a is lost or disabled, the device profile 149 can be previously stored by the management service 115. The management service 115 therefore need not display the token 124 at step 418 when the migration process has been otherwise initiated. Thereafter, the process can proceed to completion.

Figure 5:
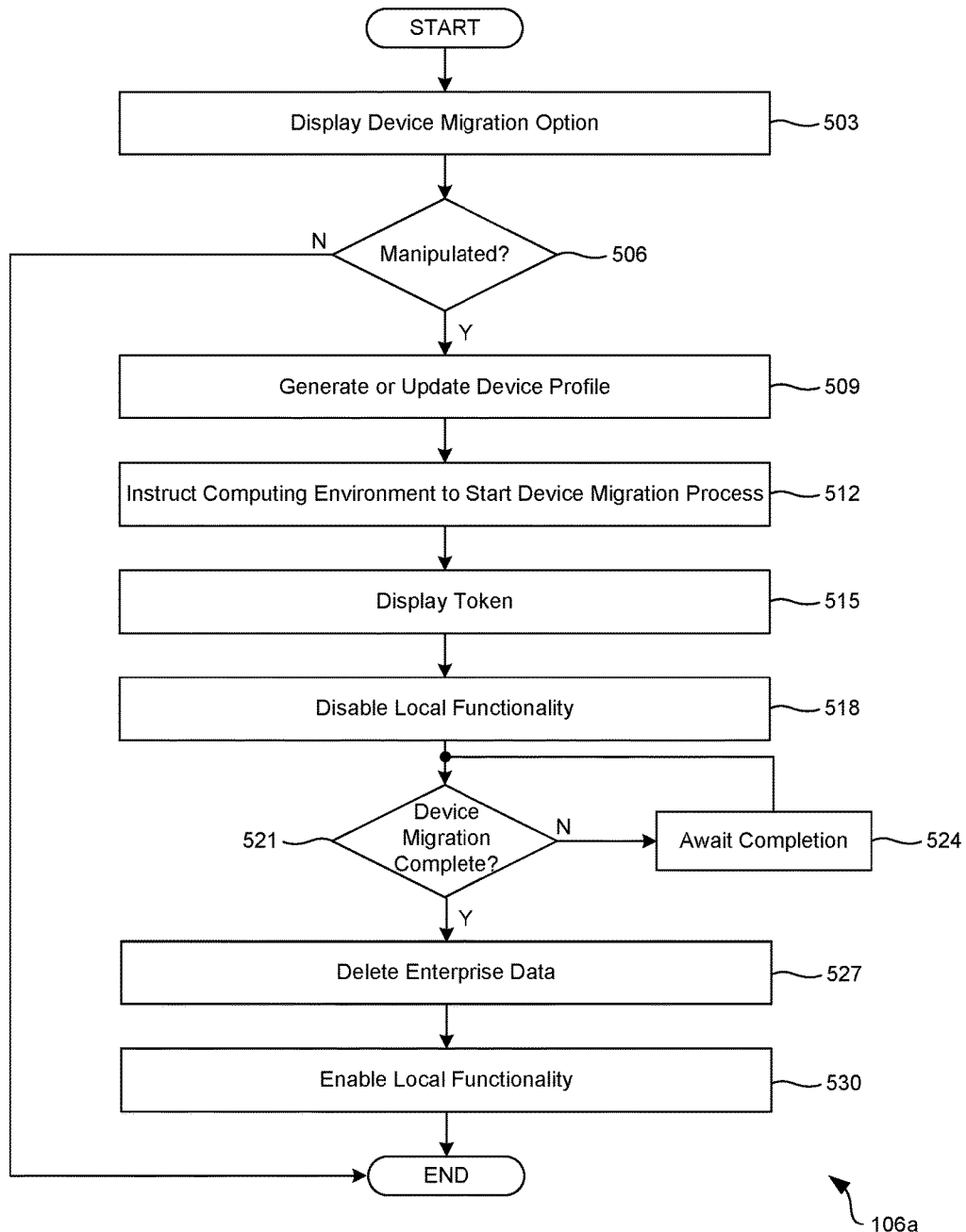
FIG. 5 is a flowchart illustrating functionality implemented by components of the networked environment.

Referring next to FIG. 5, shown is a flowchart that provides one example of the operation of a portion of the first client device 106a. The flowchart of FIG. 5 can be viewed as depicting an example of elements of a method implemented by an agent application 118 installed on the first client device 106a, or other suitable software component according to one or more examples. The separation or segmentation of functionality as discussed herein is presented for illustrative purposes only.

In step 503, the first client device 106a can display a device migration option in a display, which can include a component of a user interface 169. For instance, the device migration option can include a button, a graphic, or other component capable of being manipulated or selected in the user interface.

In step 506, the first client device 106a can determine whether the device migration option has been manipulated. For example, if the device migration option is a button shown on a touch screen display, the first client device 106a can determine whether the user pressed a region of the touch screen display that includes the device migration option. If the device migration option has not been manipulated the process can proceed to completion.

Alternatively, if the device migration option has been manipulated, the first client device 106a can generate or update a device profile 149 for the first client device 106a that describes a current configuration of the first client device 106a, in step 509. For example, the first client device 106a can generate an XML document that contains information pertaining to the configuration of the first client device 106a. The device profile 149 can include a listing of each client application 133 installed on the client device 106; settings associated with each client application 133; operating system configurations; color, wallpaper, and lock screen settings; keyboard or other input device settings, as well as other settings.

In step 512, the first client device 106a can instruct the computing environment 103 to start the device migration process. For example, the first client device 106a can generate a request for transmission over the network 109 that indicates that the device migration option has been manipulated in the agent application 118. Additionally, the first client device 106a can send the device profile 149 generated or updated in step 512 to the computing environment 103. As noted in FIG. 4A, the computing environment 103 can store the device profile 149 in the data store 130 for later access.

In step 515, the first client device 106a can display the token 124 in a user interface 169. For example, the user interface 169 can instruct the user of the first client device 106a to enter the token 124 on the second client device 106b. The token 124 can be generated locally on the first client device 106a or remotely by the computing environment 103. If generated locally, the token 124 shown in the display 172 is sent to the computing environment 103.

Next, in step 518, the first client device 106a can disable local functionality of the first client device 106a, for example, as instructed by the computing environment 103. In some examples, the first client device 106a can disable functionality for a predetermined amount of time or until a cancel migration option is manipulated on the first client device 106a. In some examples, the first client device 106a can disable functionality on the first client device 106a such that a user cannot access any features of the first client device 106a, such as turning on a display, powering off the first client device 106a, or other function. However, in some examples, the token 124 can still be viewed in the display

172 or the cancel migration component 129 can still be accessible even though some functionality of the first client device 106*a* is disabled.

In step 521, the first client device 106*a* can determine whether the device migration process has been completed or, in other words, whether the token 124 has been entered in a second client device 106*b*. If the device migration process has not been completed, the process can proceed to step 524 where the first client device 106*a* can await completion of the device migration process.

Alternatively, if the device migration has been completed, in step 527, the first client device 106*a* can delete any enterprise data 136 locally on the first client device 106*a*. This can include, for example, removing client applications 133 managed by the agent application 118, removing files generated by the agent application 118, or other action appropriate to protect enterprise data 136 now that the first client device 106*a* is not enrolled with the management service 115.

Finally, in step 530, the first client device 106*a* can enable the local functionality, such as the functionality that was disabled in step 518. Thereafter, the process can proceed to completion.

Figure 6:
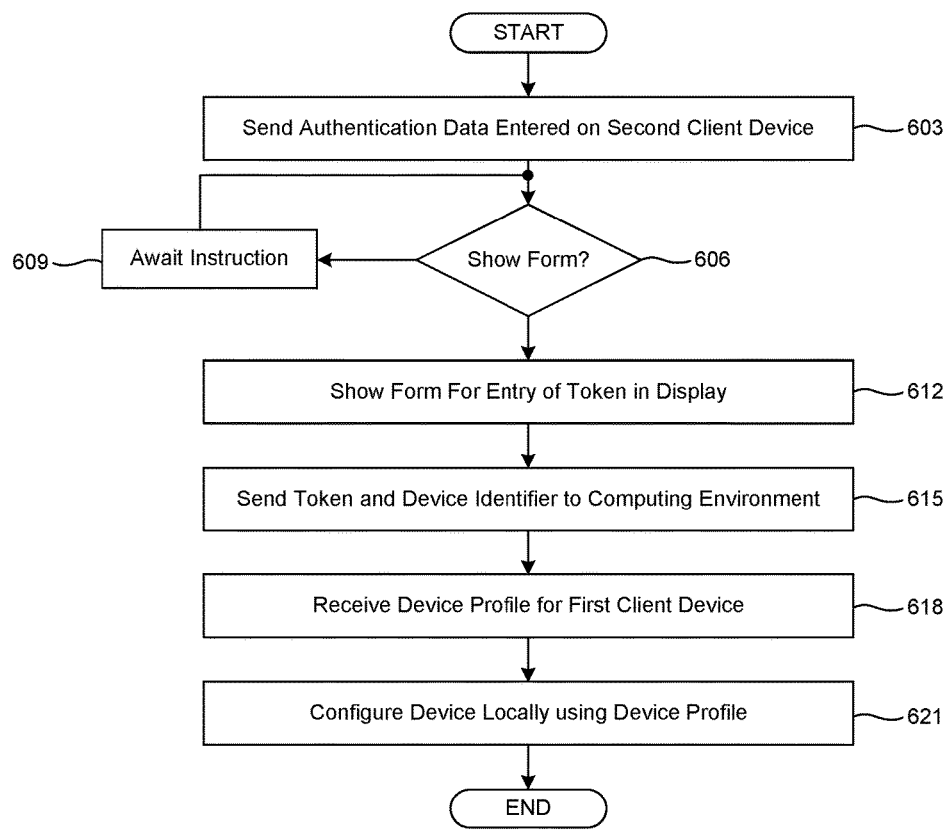
FIG. 6 is a flowchart illustrating functionality implemented by components of the networked environment.

Referring next to FIG. 6, shown is a flowchart that provides one example of the operation of a portion of the second client device 106*b*. The flowchart of FIG. 6 can be viewed as depicting an example of elements of a method implemented by an agent application 118 installed on the second client device 106*b*, or other suitable software component according to one or more examples. The separation or segmentation of functionality as discussed herein is presented for illustrative purposes only.

Beginning with step 603, the second client device 106*b* can send authentication data 175 to the computing environment 103, for example, that has been obtained through the agent application 118. The authentication data 175 can include, for example, a username, an email address, a password, a PIN number, a group identifier, an enrollment URL, biometric data or other appropriate data that can be used to authenticate a user of the second client device 106*b* with the management service 115.

In step 606, the second client device 106*b* can determine whether to show a form 127, such as a text field or other user interface component, for entry of a token 124. In some examples, the second client device 106*b* can be configured to always display a form 127 for entry of a token 124 while, in other examples, the second client device 106*b* can be configured to only show the form when instructed by the computing environment 103.

If the second client device 106*b* cannot determine whether to show the form 127, the process can proceed to step 609 where the second client device 106*b* awaits instruction from the computing environment 103, or proceeds normally.

Alternatively, if the form is to be shown, the process can proceed to step 612 where the second client device 106*b* can show the form for entry of the token 124 in a display 172. As can be appreciated, a user can manipulate the form to provide the token 124 as a string of alphanumeric characters or other suitable characters and symbols.

In step 615, the second client device 106*b* can send the token 124 and a device identifier 162 that uniquely identifies the second client device 106*b* to the computing environment 103. The computing environment 103 can use the device identifier 162 to update the data store 130, as described in step 436.

Referring back to FIG. 6, in step 618, the second client device 106*b* can receive a device profile 149 for the first client device 106*a* or other file that instructs the agent application 118 how to configure the device. For instance, the device profile 149 can include an XML, document.

In step 621, the second client device 106*b* can configure the device locally using the device profile 149 or, in other examples, can configure the second client device 106*b* as instructed by the computing environment 103. In one example, the second client device 106*b* can install the same client applications 133 as those installed on the first client device 106*a*. For example, a device profile 149 can include application identifiers for each of the client applications 133 installed on the old client device 106*a*. The agent application 118*b* on the new client device 106*b* can query an application store installed on the new client device 106*b* to download applications using the application identifiers.

In some examples, the client application 133 installed on the first client device 106*a* can include enterprise client applications 133. To this end, the agent application 118*b* on the new client device 106*b* can query an enterprise application store installed on the new client device 106*b* to download the enterprise applications using the application identifiers. If transitioning from a first type of client device 106*a*, such as Android®, to a second type of client device 106*b*, such as Apple® iOS®, a mapping of application identifiers stored in the data store 130 can be used to correlate the application identifier for the Android® version of the client application 133 to the iOS® version of the client application 133, if available.

In another example, icons associated with a managed client application 133 can be shown in association with a badge or other symbols indicating that the client application 133 is managed by the agent application 118 or the management service 115. As can be appreciated, managed client applications 133 can be easily recognized by the agent application 118 as a list of installed applications can be identified from an application store of the client device 106, a registry of the client device 106, a managed client applications 133 section of the agent application 118, or from the data store 130 managed by the management service 115.

When migrating from the first client device 106*a* to the second client device 106*b*, a list of the client applications 133 installed on the first client device 106*a* can be sent to the second client device 106*b*. Using the list of the client application 133, a network service or an application store installed on the second client device 106*b* can be queried to install the client applications 133 on the second client device 106*b*. For instance, the client applications 133 can be obtained from Google® Play™, the Apple® App Store®, the Microsoft® Windows® store, or other application store. As can be appreciated, human or server side intervention is reduced or eliminated for various parts of the migration process, such as downloading and installing client applications 133 on the second client device 106*b*. In some examples, a download URL for a client application 133 can be shared between the first client device 106*a* and the second client device 106*b*.

In another example, the second client device 106*b* can configure the desktop, wallpaper, or lock screen to match that of the first client device 106*a*. In yet another example, the second client device 106*b* can configure the settings of an operating system to match the previously configured settings on the first client device 106*a*. The second client device 106*b* is enrolled with the management service 115 by the computing environment 103. Thereafter, the process can proceed to completion.

The client devices 106 or devices making up the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 133, and potentially other applications. Also stored in the memory can be a data store 130 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 169 generated by the client application 133 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application, and other various systems described herein can be embodied in software or code executed by general-purpose hardware as discussed above, as an alternative the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium for managed device migration and configuration embodying program instructions executable in at least one computing device that, when executed by the at least one computing device, cause the at least one computing device to:
   in response to a first client device enrolling with a management service, maintain, by the management service, a device profile of the first client device that describes a current configuration of the first client device in a data store;
   cause, by the management service, a token to be shown on the first client device enrolled with the management service, wherein the token comprises a string of randomly-generated characters;
   detect, by the management service, a desired migration from the first client device enrolled with the management service to a second client device based at least in part on an entry of the token being performed on the second client device, wherein the second client device is not enrolled with the management service;
   unenroll, by the management service, the first client device with the management service;
   enroll, by the management service, the second client device with the management service;
   identify, from the device profile of the first client device by the management service, a plurality of client applications to be installed on the second client device that were installed on the first client device;
   cause, by the management service, an installation of the plurality of client applications on the second client device; and
   cause, by the management service, an agent application executable on the second client device to configure the client applications on the second client device based on at least one setting retrieved from the device profile.

2. The non-transitory computer-readable medium of claim 1, further comprising program instructions that, when executed, cause the at least one computing device to update the data store to replace a first device identifier corresponding to the first client device with a second device identifier corresponding to the second client device.

3. The non-transitory computer-readable medium of claim 1, wherein the agent application installed on the second client device is instructed by the management service to configure the second client device to match the current configuration of the first client device silently.

4. The non-transitory computer-readable medium of claim 1, wherein the desired migration is further detected based at least in part on a manipulation of a device migration option on the first client device that is configured to start the desired migration from the first client device to the second client device, the device migration option comprising a component in a user interface.

5. The non-transitory computer-readable medium of claim 4, further comprising program instructions that, when executed, cause the at least one computing device to disable at least one function of the first client device after the manipulation of the device migration option is detected by the at least one computing device.

6. The non-transitory computer-readable medium of claim 5, wherein the at least one function of the first client device is disabled for a predetermined amount of time or until a cancel migration option is manipulated on the first client device.

7. The non-transitory computer-readable medium of claim 1, further comprising program instructions that, when executed, cause the at least one computing device to:
receive authentication data from the second client device; and
in response to the authentication data indicating that the second client device is associated with a same account or a same entity as the first client device, cause a display of at least one user interface component on the second client device that permits the entry of the token.

8. A system for managed device migration and configuration, comprising:
at least one computing device comprising at least one hardware processor; and
program instructions executable in the at least one computing device that, when executed, cause the at least one computing device to:
in response to a first client device enrolling with a management service, maintain, by the management service, a device profile of a first client device that describes a current configuration of the first client device in a data store;
cause, by the management service, a token to be shown on the first client device enrolled with the management service, wherein the token comprises a string of randomly-generated characters;
detect, by the management service, a desired migration from the first client device enrolled with the management service to a second client device based at least in part on an entry of the token being performed on the second client device, wherein the second client device is not enrolled with the management service;
unenroll, by the management service, the first client device with the management service;
enroll, by the management service, the second client device with the management service;
identify, from the device profile of the first client device by the management service, a plurality of client applications to be installed on the second client device that were installed on the first client device;
cause, by the management service, an installation of the plurality of client applications on the second client device; and
cause, by the management service, an agent application executable on the second client device to configure the client applications on the second client device based on at least one setting retrieved from the device profile.

9. The system of claim 8, further comprising program instructions that, when executed, cause the at least one computing device to update the data store to replace a first device identifier corresponding to the first client device with a second device identifier corresponding to the second client device.

10. The system of claim 8, wherein the agent application installed on the second client device is instructed by the management service to configure the second client device to match the current configuration of the first client device silently.

11. The system of claim 8, wherein the desired migration is further detected based at least in part on a manipulation of a device migration option on the first client device that is configured to start the desired migration from the first client device to the second client device, the device migration option comprising a component in a user interface.

12. The system of claim 11, further comprising program instructions that, when executed, cause the at least one computing device to disable at least one function of the first client device after the manipulation of the device migration option is detected by the at least one computing device.

13. The system of claim 12, wherein the at least one function of the first client device is disabled for a predetermined amount of time or until a cancel migration option is manipulated on the first client device.

14. The system of claim 8, further comprising program instructions that, when executed, cause the at least one computing device to:
receive authentication data from the second client device; and
in response to the authentication data indicating that the second client device is associated with a same account or a same entity as the first client device, cause a display of at least one user interface component on the second client device that permits the entry of the token.

15. A computer-implemented method for managed device migration and configuration, comprising:
in response to a first client device enrolling with a management service, maintaining, by the management service, a device profile of a first client device that describes a current configuration of the first client device in memory;
causing, by the management service, a token to be shown on the first client device enrolled with the management service, wherein the token comprises a string of randomly-generated characters;
detecting, by the management service, a desired migration from the first client device enrolled with the management service to a second client device based at least in part on an entry of the token being performed on the second client device, wherein the second client device is not enrolled with the management service;
unenrolling, by the management service, the first client device with the management service;
enrolling, by the management service, the second client device with the management service;
identifying, by the management service from the device profile of the first client device, a plurality of client applications to be installed on the second client device that were installed on the first client device;

causing, by the management service, an installation of the plurality of client applications on the second client device; and instructing, by the management service, an agent application executable on the second client device to configure the client applications on the second client device based on at least one setting retrieved from the device profile.

16. The computer-implemented method of claim 15, further comprising updating a portion of the memory to replace a first device identifier corresponding to the first client device with a second device identifier corresponding to the second client device.

17. The computer-implemented method of claim 15, wherein the agent application installed on the second client device is instructed by the management service to configure the second client device to match the current configuration of the first client device silently.

18. The computer-implemented method of claim 15, wherein the desired migration is further detected based at least in part on a manipulation of a device migration option on the first client device that is configured to start the desired migration from the first client device to the second client device, the device migration option comprising a component in a user interface.

19. The computer-implemented method of claim 18, further comprising disabling at least one function of the first client device after the manipulation of the device migration option is detected.

20. The computer-implemented method of claim 19, wherein the at least one function of the first client device is disabled for a predetermined amount of time or until a cancel migration option is manipulated on the first client device.

\* \* \* \* \*